(12) United States Patent
Hsiao et al.

(10) Patent No.: US 10,179,537 B2
(45) Date of Patent: Jan. 15, 2019

(54) SMART BRAKE WARNING SYSTEM

(71) Applicants: Chia-Wei Hsiao, Ji'an Township (TW); Chia-Hung Hsiao, Ji'an Township (TW); Chih-Jen Hsiao, Ji'an Township (TW)

(72) Inventors: Chia-Wei Hsiao, Ji'an Township (TW); Chia-Hung Hsiao, Ji'an Township (TW); Chih-Jen Hsiao, Ji'an Township (TW)

( * ) Notice: Subject to any disclaimer, the term of this patent is extended or adjusted under 35 U.S.C. 154(b) by 0 days.

(21) Appl. No.: 15/621,354

(22) Filed: Jun. 13, 2017

(65) Prior Publication Data

US 2018/0147979 A1    May 31, 2018

(30) Foreign Application Priority Data

Nov. 30, 2016   (TW) .............................. 105139510 A (51) Int. Cl.
*B60Q 1/44* (2006.01)
*B60Q 1/00* (2006.01)
*B60Q 1/30* (2006.01)

(52) U.S. Cl.
CPC .......... *B60Q 1/447* (2013.01); *B60Q 1/0088* (2013.01); *B60Q 1/30* (2013.01); *B60Q 1/302* (2013.01)

(58) Field of Classification Search
CPC .......... B60Q 1/44; B60Q 1/444; B60Q 1/446; B60Q 1/447; B60Q 1/30; B60Q 1/50; B60Q 1/0088
See application file for complete search history.

(56) References Cited

U.S. PATENT DOCUMENTS

| | | | | |
|---|---|---|---|---|
| 5,089,805 A * | 2/1992 | Salsman | ............... | B60Q 1/447 200/61.45 R |
| 5,831,521 A * | 11/1998 | Huang | ................... | B60Q 1/445 200/61.45 R |
| 5,847,646 A * | 12/1998 | Mucciacciaro | ........ | B60Q 1/444 340/469 |
| 6,753,769 B1 * | 6/2004 | Elliott | ................... | B60Q 1/441 340/464 |
| 7,307,518 B2 * | 12/2007 | Bogos | ................... | B60Q 1/302 340/467 |
| 7,642,908 B2 * | 1/2010 | Mertens | ................... | B60Q 1/20 340/463 |
| 2005/0237175 A1 * | 10/2005 | Paulson | ................ | B60Q 1/447 340/479 |

(Continued)

*Primary Examiner* — Thai Pham
(74) *Attorney, Agent, or Firm* — David Chavous; Chavous Intellectual Property Law LLC (57) ABSTRACT

The present invention relates to a smart brake warning system, wherein the system is installed on a vehicle body either directly or using a base. The system comprises at least a warning light device, which is used to emit different modes or degrees of light to serve as a warning for vehicles approaching from the rear, and at least one inertia detection device, which is used to detect the inertia of the vehicle at that instance, and control the warning light device to emit different degrees of light mode according to the size of the inertia force. Even if the vehicle driver does not step on the vehicle brake, the present invention is still able to produce a warning signal to vehicle drivers approaching from the rear, achieving a forced warning effect that prevents accidental rear-end collisions.

6 Claims, 6 Drawing Sheets

(56) References Cited

U.S. PATENT DOCUMENTS

2006/0273891 A1* 12/2006 Quach .................... B60Q 1/302
340/467
2009/0322508 A1* 12/2009 Malik .................... B60Q 1/447
340/471

* cited by examiner

SMART BRAKE WARNING SYSTEM

FIELD OF THE INVENTION

The present invention relates to a warning system, and more particularly to a smart brake warning system that uses the inertia force of a vehicle to produce different degrees of warnings.

BACKGROUND

According to a national statistics report released at the end of February 2016, there were 21,410,000 registered motor vehicles in Taiwan, which was a 0.5% increase compared to the number of registered motor vehicles in the report released at the end of February 2015. Among the registered vehicles, 13,660,000 motorcycles amounted to a decrease of 60,000 motorcycles compared to 2015. whereas the 7,750,000 registered cars increased by 160,000. The passing of time has enlarged the sphere of daily life, and the means of transportation grows with each passing day, which is reflected around the world. However, the bad habit of motor vehicle drivers deliberately slamming the brakes on (in urgency) to stop their vehicles is a devil of a problem for governments around the world.

The brake lights fitted to a current vehicle body have the single effect of only lighting up when the driver applies the vehicle brake, and are unable to effectively reflect the traveling circumstances of the vehicle itself. Generally speaking, there are many circumstances for a vehicle to decelerate, such as: relaxing the accelerator pedal, lightly stepping on the brake pedal to reduce speed, emergency braking, etc. However, vehicles approaching from the rear are unable to know the front vehicle's circumstances from its brake lights, which can lead to rear-end collisions continuing to happen.

Because existing brake lights only light up when the driver steps on the vehicle brake, however, vehicle deceleration is not necessarily because of stepping on the brake pedal, for example: relaxing the accelerator pedal to reduce speed, making it impossible for vehicle drivers approaching from the rear to know. In addition, as regards obliviously dangerous driving, such as drunk drivers, it's impossible for drivers approaching from the rear to know the mental state of the driver in front. Accidental collisions involving heavy vehicles often lead to the highest fatal and serious casualty toll. Among all vehicle accidents, the most horrifying is when there is "no application of the brakes whatsoever." Possible circumstances for the cause of traffic accidents due to oblivious driving with no application of the vehicle brake include: drunk driving, fatigue driving, mechanical breakdown, taking prohibited substances, or using gear downshift braking.

Hence, it is the strong desire of the inventor of the present invention and manufacturers engaged in related art, and purpose of the present invention to research, improve, and resolve the aforementioned problems and shortcomings.

SUMMARY

Accordingly, In light of the aforementioned shortcomings, the inventor of the present invention, having collected related data, and through evaluation and consideration from many aspects, as well as having accumulated years of experience in related arts, through continuous testing and improvements, has designed a new smart brake warning system.

The object of the the present invention lies in providing a smart brake warning system, which produces different degrees of warning effectiveness using the inertia force size produced by the vehicle itself when traveling.

In order to achieve the aforementioned object, the smart brake warning system of the the present invention is installed on a vehicle body for the purpose of warning other vehicles, and comprises: a warning light device, which is installed on the vehicle body and used to emit light for the purpose of warning other vehicles; and at least one inertia detection device, which is installed on the vehicle body and connected to the warning light device. The inertia detection device is used to detect the size of the inertia force of the vehicle and cause the warning light device to emit a corresponding light mode according thereto.

In a preferred embodiment of the present invention, the warning light device is the brake lights of the vehicle body.

In a preferred embodiment of the present invention, the warning light device is a third brake light of the vehicle body.

In a preferred embodiment of the present invention, the inertia detection device comprises two contact points and a sliding member, whereby when there is a change in the inertia of the vehicle body, the vehicle inertia causes the sliding member to slide and make contact with the two contact points, thereby causing the warning light device to emit light for the purpose of warning other vehicles.

In a preferred embodiment of the present invention, there are at least two of the inertia detection devices, which are arranged and configured at different angles.

In the preferred embodiment of the present invention, the corresponding light modes emitted by the warning light device include number of lights, light frequency, light color, and light length.

To enable a further understanding of said objectives and the technological methods of the invention herein, a brief description of the drawings is provided below followed by a detailed description of the preferred embodiments.

DETAILED DESCRIPTION

A detailed description of the technological means adopted to achieve the aforementioned object and effectiveness are provided below together with the diagrams that show the preferred embodiments, structure, characteristics, and functions of the present invention to facilitate complete understanding thereof.

Figure 1:
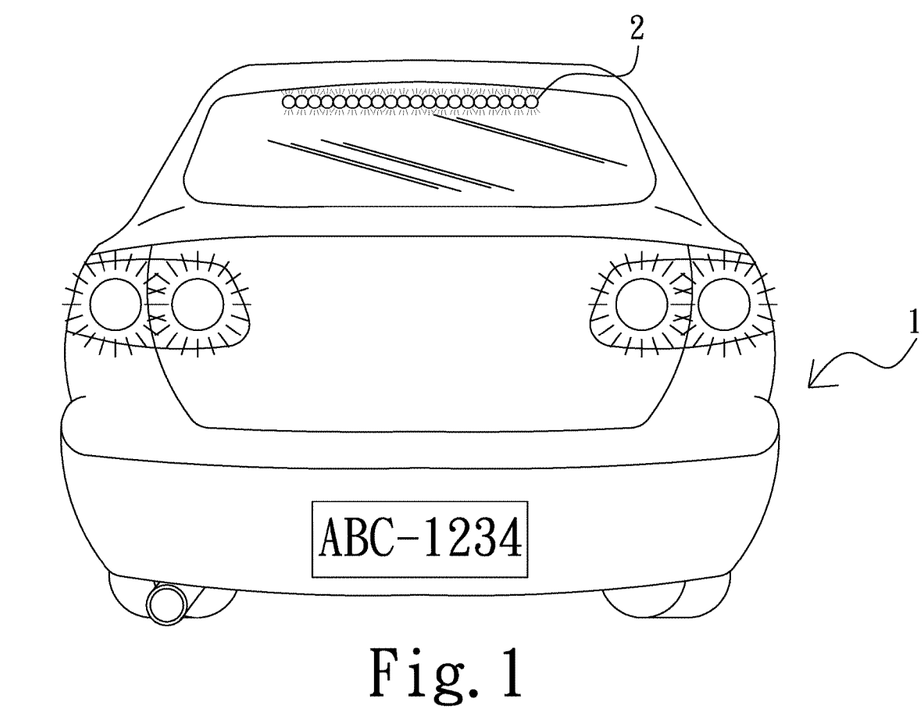
FIG. 1 is an implementation schematic view 1 of a preferred embodiment of a smart brake warning system of the present invention.
Figure 2A:
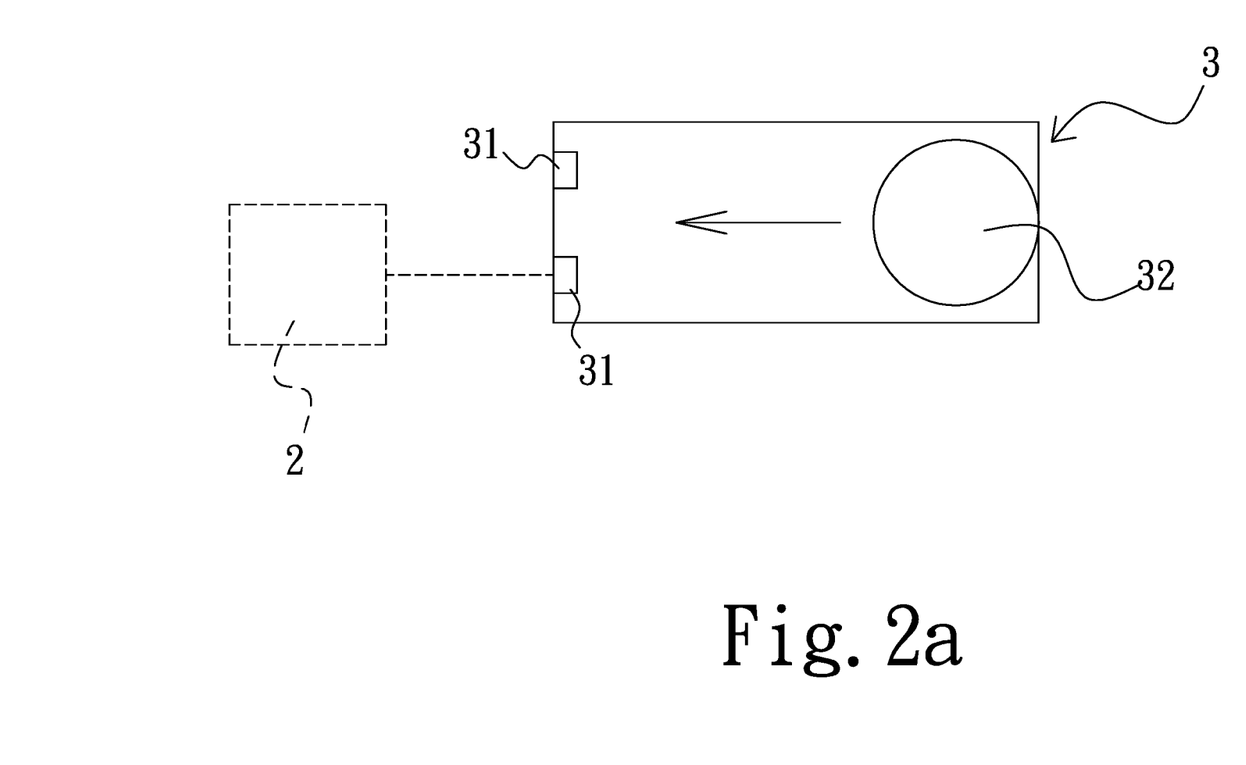
FIG. 2*a* is an implementation schematic view 2 of a preferred embodiment of the smart brake warning system of the present invention.

Referring to FIG. 1 and FIG. 2a, which show implementation schematic views 1 and 2 of a preferred embodiment of a smart brake warning system of the present invention, respectively, and it can be clearly seen from the drawings that the smart brake warning system of the present invention is installed on a vehicle body 1 for the purpose of warning other vehicles. More specifically, the present invention can be used to execute a pre-warning to other drivers when the vehicle decelerates but there is no application of the vehicle brakes whatsoever (such as: relaxing the accelerator pedal, gear downshift braking). The smart brake warning system comprises: a warning light device 2 and at least one inertia detection device 3.

The warning light device 2 is installed on the vehicle body 1, for example, installed at the rear of the vehicle body 1, to prompt attention of vehicles approaching from the rear. The warning light device 2 is used to emit light for the purpose of warning other vehicles, and it is preferable that the warning light device 2 is a brake light of the vehicle body 1, wherein the so-called "brake light" refers to a brake light that emits light when the vehicle brake is applied. In addition, the warning light device 2 can be a third brake light of the vehicle body 1, wherein the so-called "third brake light," apart from the brake light described and defined above, refers to another brake light of the vehicle body 1 used for the purpose of warning other vehicles. Specifically, the warning light device 2 can be electric bulbs, and could also be a light emitting diode strip light, a light emitting diode array, and the like. The present invention is not limited by the form of the warning light device 2; moreover, the warning light device 2 is able to emit different colored lights to serve a warning function of different degrees.

The at least one inertia detection device 3 is installed on the vehicle body 1 and connected to the warning light device 2. The inertia detection device 3 is used to detect the size of the inertia force of the vehicle, and cause the warning light device 2 to emit a corresponding light mode according to the size of the inertia force. It is preferable that the inertia detection device 3 comprises two contact points 31 and a sliding member 32. When there is a change in the inertia of the vehicle, the vehicle inertia causes the sliding member 32 to slide and make contact with the two contact points 31, thereby causing the warning light device 2 to emit light to serve a warning function. A more detailed description of the inertia detection device 3 includes one of the two contact points 31 being connected to the storage battery of the vehicle, and the other contact point 31 being connected to the warning light device 2. Accordingly, when there is a change in the inertia of the vehicle, the vehicle inertia causes the sliding member 32 to slide and make contact with the two contact points 31, thereby causing the warning light device 2 to make an electrical connection with the storage battery, which further causes the warning light device 2 to emit light to serve a warning function.

Referring to FIG. 2a, which clearly shows the concrete structure of the inertia detection device 3, and it can be clearly seen from the drawing that the inertia detection device 3 comprises the two contact points 31 and the sliding member 32, wherein the two contact points 31 are made from metal, and the sliding member 32 can be a metal or non-metal spherical body (and can also be a liquid spherical body). When the vehicle is traveling, because of the law of inertia, the metal spherical body rolls inside the inertia detection device 3 towards the side opposite the direction the vehicle is traveling. However, if the vehicle decelerates because of some emergency, but the driver has not applied the brakes, because of the law of inertia, the metal spherical body is caused to roll in the direction the vehicle is traveling and make contact with the two contact points 31, which further effects an electrical connection with the warning light device 2, enabling the the warning light device 2 to emit light.

Furthermore, one of the two contact points 31 of the inertia detection device 3 of the smart brake warning system of the present invention can also be connected to another power source other than the vehicle storage battery, and the other contact point 31 is connected to the warning light device 2. Accordingly, with such a configuration of the two power sources, regardless of whether the storage battery has electric power stored or not, as long as a change in the vehicle inertia occurs because of an emergency braking situation, an unbroken electrical connection is maintained with the warning light device 2 due to it being connected to another power source other than the vehicle storage battery, and thus is similarly able to emit light and serve a warning function.

How the smart brake warning system of the present invention detects different sizes of inertia force of the vehicle is described as follows. The present invention primarily uses a plurality of inertia detection devices 3 to detect the different sizes of inertia force of the vehicle, for example: there are at least two of the inertia detection devices 3, which are arranged and configured at different angles. Referring together with the drawing depicted in FIG. 2b, which shows an implementation schematic view 3 of a preferred embodiment of the smart brake warning system, and it can be clearly seen from the drawing that there are three of the inertia detection devices 3; moreover, the inertia detection devices 3 are arranged and configured to be adjustable or fixed at different angles, e.g., the three inertia detection devices 3 can be respectively arranged and configured at 0 degrees, 30 degrees, and 60 degrees. Accordingly, if the vehicle decelerates because of some emergency, but the driver has not applied the brakes, because of the law of inertia, the inertia detection device 3 configured at 0 degrees will be first triggered; next, when the size of the inertia force of the vehicle increases, then the inertia detection device 3 configured at 30 degrees will be triggered; finally, when the size of the inertia force is maximum, then the inertia detection device 3 configured at 60 degrees will be triggered. Accordingly, the present invention is able to use different configuration modes of the inertia detection devices 3 to achieve detecting different sizes of inertia force.

Figure 2B:
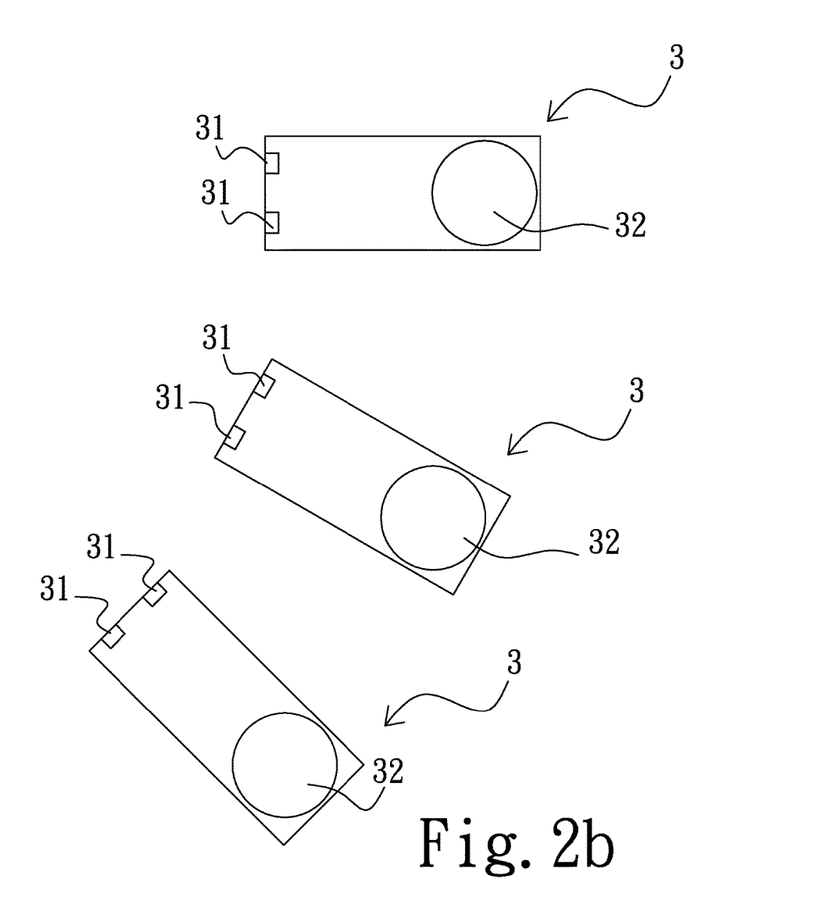
FIG. 2*b* is an implementation schematic view 3 of a preferred embodiment of the smart brake warning system of the present invention.

It is hereby expressively pointed out that the method disclosed for the so-called detection of inertia force size is not limited to that described in the present specification, for example, the bottom portion of the inertia detection devices 3 may be provided with different gradients to to increase the degree of difficulty for the sliding member 32 to slide to the two contact points 31, thereby similarly achieving the effectiveness disclosed in the embodiment of the present invention.

Figure 3A:
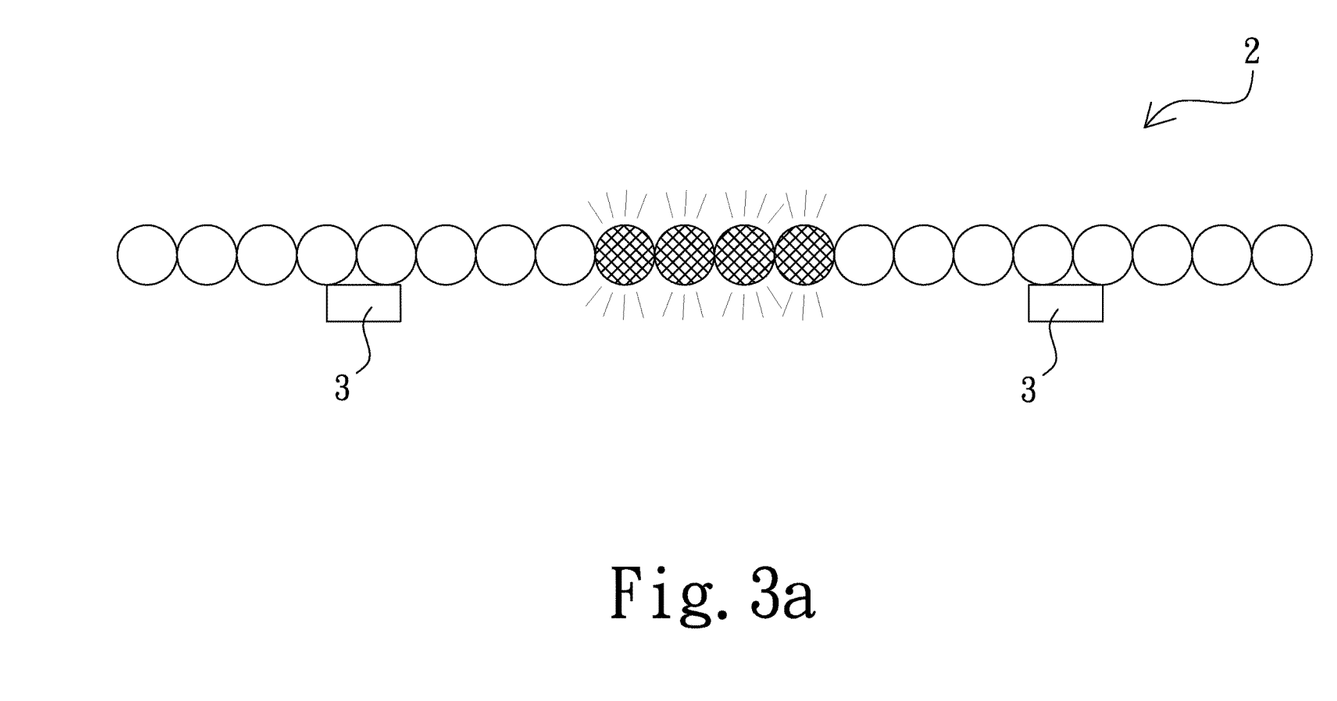
FIG. 3*a* is an implementation schematic view 4 of a preferred embodiment of the smart brake warning system of the present invention.
Figure 3B:
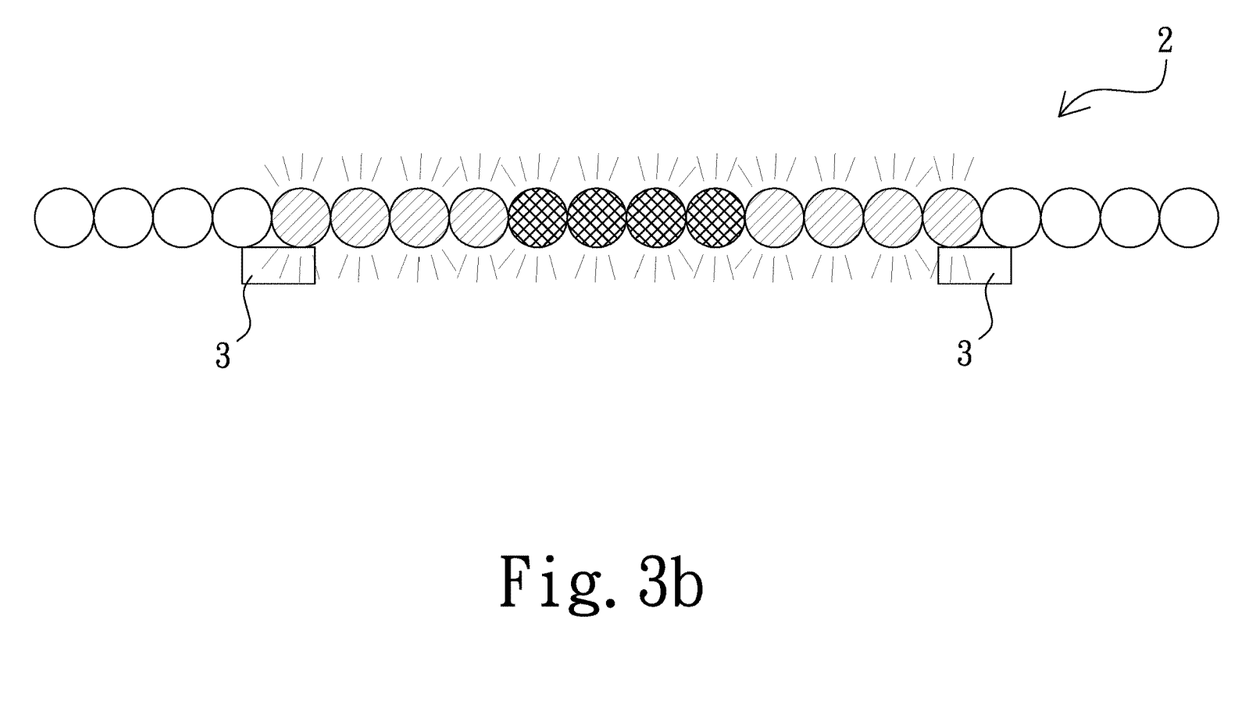
FIG. 3*b* is an implementation schematic view 5 of a preferred embodiment of the smart brake warning system of the present invention.
Figure 3C:
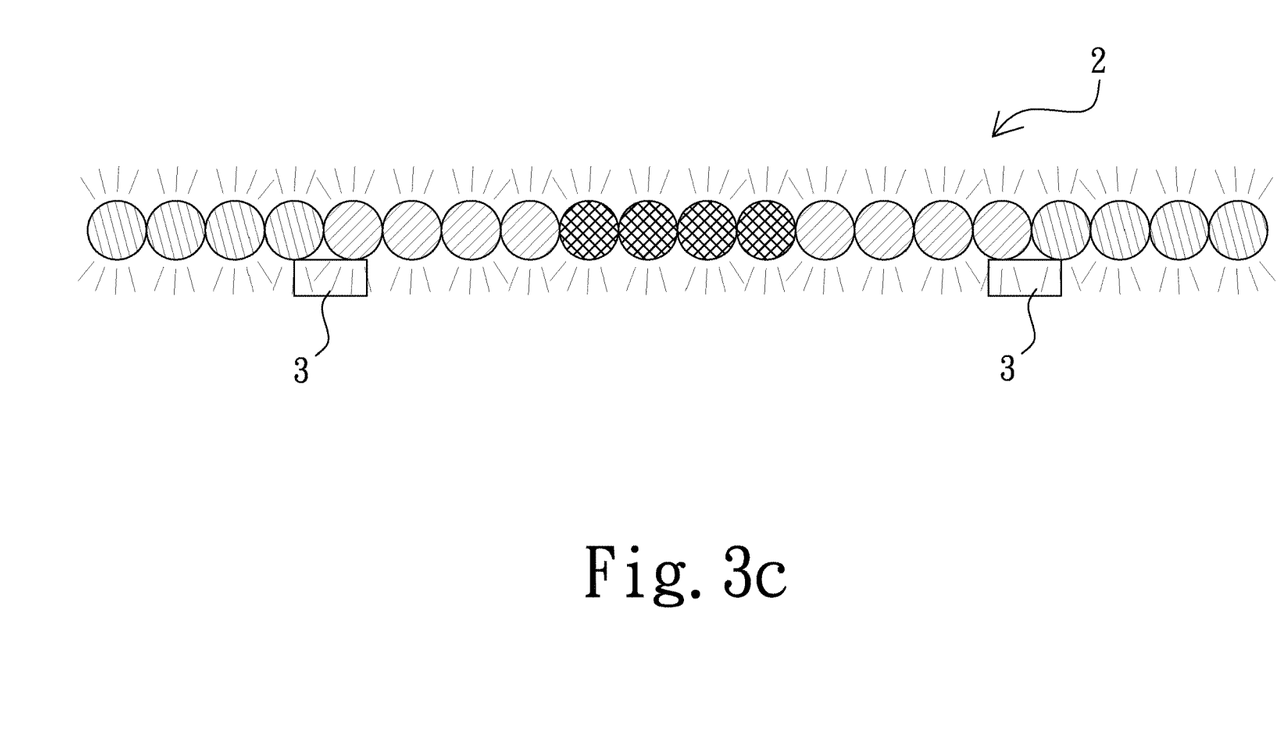
FIG. 3*c* is an implementation schematic view 6 of a preferred embodiment of the smart brake warning system of the present invention.

According to the aforementioned structure and constructional design of the present invention, herein an exemplary embodiment is used to describe circumstances regarding application thereof as follows: Referring together to the drawings depicted in FIGS. 3a, 3b, and 3c, which show implementation schematic views 4, 5, and 6 of the preferred embodiment of the smart brake warning system of the present invention, respectively; and it can be clearly seen from the drawings that the corresponding light modes emitted by the warning light device 2 include number of lights, light frequency, light color, and light length. Providing a more detailed description, when there is a change in the inertia force of the vehicle, the present invention can display different circumstances according to the emergency situation. As described above, the three inertia detection devices 3 configured at different angles are able to connect to a different number of lamps, whereby when the inertia force is minimum, the inertia detection device 3 configured at 0 degrees is activated by contact, whereupon the lamps in the middle of the warning light device 2 light up (e.g., using red colored lamps). When the inertia force increases, the inertia detection device 3 configured at 30 degrees is activated by contact, which not only causes the lamps in the middle of the warning light device 2 to light up, but also the lamps on the two sides thereof light up (e.g., using blue colored lamps). When the inertia force is maximum, the inertia detection device 3 configured at 60 degrees is activated by contact, which not only causes the lamps in the middle and two sides thereof of the warning light device 2 to light up, but also the lamps on the outermost two sides of the warning light device 2 similarly light up (e.g., using white colored lamps). Accordingly, the present invention is able to reflect different emergency situations (such as: red+blue=emergency situation) enabling vehicles approaching from the rear to take evasive action or brake).

In another circumstance, under normal conditions, the present invention can also function in coordination with a regular vehicle's brake lights and light up in synchronization therewith.

Application of the smart brake warning system of the present invention is hereby expressively described as follows. The vehicle driver does not need to apply the vehicle brake with the the smart brake warning system still being able to display the current circumstances of the traveling vehicle according to the inertia of the vehicle itself, such as: whether or not the accelerator pedal has been relaxed, (that is/or light application of the brakes, braking, emergency braking), light application of the brakes, or emergency braking. Accordingly, because the present invention adopts the principle of inertia, thus, a warning effect is still effected even if the driver does not step on the vehicle brake, thereby achieving the effectiveness of preventing rear vehicles colliding.

Hence, referring to all the attached diagrams, compared to the prior art, the smart brake warning system of the present invention has the following advantage when in use: the size of the inertia force produced by the vehicle when traveling is used to produce different degrees of warning effectiveness.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A smart brake warning system, which is installed on a vehicle body for the purpose of warning other vehicles; comprising:
    a warning light device, the warning light device is installed on the vehicle body, and is used to emit light for the purpose of warning other vehicles; and
    at least two inertia detection device, the inertia detection device is installed on the vehicle body or on the warning light device, and is used to connectively control the warning light device, the inertia detection device detects a size of an inertia force of the vehicle, and causes the warning light device to emit a corresponding light mode according to the size of the inertia force, and wherein the inertia detection devices comprised two contact points and a sliding member; when there is a change in the inertia force of the vehicle, the vehicle inertia causes the sliding member to slide and make contact with the two contact points, which causes the warning light device to emit light for the purpose of warning other vehicles; at least two of the number of inertia detection devices, which are arranged and configured at different angles.

2. The smart brake warning system according to claim 1, wherein the warning light device is a brake light of the vehicle body.

3. The smart brake warning system according to claim 1, wherein the warning light device is a third brake light of the vehicle body.

4. The smart brake warning system according to claim 1, wherein the corresponding light modes emitted by the warning light device include number of lights, light frequency, light color, and light length.

5. The smart brake warning system according to claim 1, wherein the inertia detection device comprises a spherical body located within a chamber of the inertia detection device.

6. The smart brake warning system according to claim 5, wherein the spherical body is configured to slide within the chamber.

* * * * *